United States Patent Office 3,763,284
Patented Oct. 2, 1973

3,763,284
SUBSTITUTED S,S-DICHLOROMETHYL O,O-DIORGANO THIOPEROXYPHOSPHORODITHIOATES
Wendell Gary Phillips, Olivette, Mo., assignor to Monsanto Company, St. Louis, Mo.
No Drawing. Filed Sept. 20, 1971, Ser. No. 182,133
Int. Cl. C07f 9/16
U.S. Cl. 260—934    11 Claims

ABSTRACT OF THE DISCLOSURE

Substituted S,S-dichloromethyl O,O-diorgano thioperoxyphosphorodithioates are prepared from substituted dichloromethane sulfenyl chlorides by reaction with an O,O-diorgano phosphorodithioate. These compounds are pesticidally active and particularly useful as pre-emergent herbicides.

---

This invention relates to substituted S,S-dichloromethyl O,O-diorgano thioperoxyphosphorodithioates of the formula $$E-CCl_2-S-S-\overset{\overset{S}{\|}}{P}(OR'')_2$$

and their manufacture from the corresponding substituted dichloromethane sulfenyl chlorides of the formula $$E-CCl_2-S-Cl$$

and an O,O-diorgano phosphorodithioate of the formula $$(R''O)_2\overset{\overset{S}{\|}}{P}-SH$$

wherein E— is

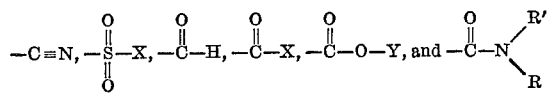

X is phenyl, halophenyl, trihalomethyl phenyl or lower alkyl phenyl, Y is lower alkyl or benzyl, R and R' are each, independently, phenyl, halophenyl, trihalomethyl phenyl, lower alkyl phenyl, lower alkyl, lower alkoxyalkyl, or lower alkoxy or R and R' when taken together are alkylene of the empirical formula $C_nH_{2n}$ wherein $n$ is an integer from 4 through 8, inclusive, and having from 4 through 8 carbons in a continuous chain between the nitrogen terminal valence bonds, and R" is phenyl, halophenyl, trihalomethyl phenyl, lower alkyl phenyl, lower alkoxy phenyl, cyanophenyl, primary or secondary lower alkyl, halo-substituted lower alkyl, or phenyl-substituted lower alkyl.

Lower alkyl is alkyl having from 1 to 5 carbons. Examples of lower alkyl include methyl, ethyl, propyl, butyl, and pentyl and the various isomeric forms thereof.

Lower alkoxy have from 1 to 5 carbons. Examples of alkoxy include methoxy, ethoxy, propoxy, butoxy, and pentoxy and the various isomeric forms thereof. Lower alkoxyalkyl have from 2 to 8 carbons. Examples of lower alkoxyalkyl include, but are not limited to, propoxymethyl, butoxybutyl, butoxyethyl, methoxymethyl, and ethoxypropyl.

Halo is a halogen selected from the group consisting of fluorine, chlorine, bromine and iodine.

Examples of the substituted phenyl groups found in compounds of this invention include substituted phenyls of the formula

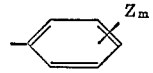

wherein Z is halo, trihalomethyl, cyano, lower alkoxy or lower alkyl and $m$ is an integer from 1 through 3, inclusive.

Examples of heterocyclic groups of nitrogen and alkylene of the empirical formula $C_nH_{2n}$ wherein $n$ is an integer from 4 through 8, inclusive, and having from 4 through 8 carbons in a continuous chain between the nitrogen terminal valence bonds include but are not limited to pyrrolidinyl, piperidinyl, hexamethyleneimino, heptamethyleneimino, octamethyleneimino, 2-ethylpyrrolidinyl, 3-butylpyrrolidinyl, 2,5-dimethylpyrrolidinyl, 2,5-diethylpyrrolidinyl, 3,4-dimethylpyrrolidinyl, 2-pipecolinyl, 3-pipecolinyl, 4-pipecolinyl, 2,6-dimethylpiperidinyl, 2-ethyl-6-methylpiperidinyl, 2-propylpiperidinyl, 3-methylhexamethyleneimino, 3,4-dimethylhexamethyleneimino, and the various isomeric forms thereof.

The compounds of this invention are conveniently and efficiently prepared by the reaction, in the presence of an HCl scavenger, of about equimolecular proportions of a substituted dichloromethane sulfenyl chloride of the formula $$E-CCl_2-S-Cl$$

and an O,O-diorgano phosphorodithioate of the formula $$(R''O)_2\overset{\overset{S}{\|}}{P}-SH$$

wherein E and R" have the aforementioned significance. The reaction is postulated to proceed as follows:

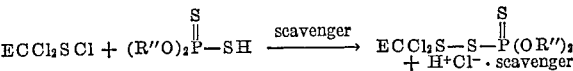

The HCl scavenger must be present in at least an equimolecular amount as compared to the substituted sulfenyl chloride. Generally not more than twice the equimolecular amount of scavenger is useful although the maximum amount is not critical. The type of scavenger is not critical to the invention so long as it does not interfere with the reaction of the phosphorodithioate and the substituted sulfenyl chloride. Preferred scavengers are trialkyl amines. More preferred trialkylamines have from 2 through 5 carbons in the alkyl group.

The reaction mass may consist only of the aforedescribed reactants and their reaction products or it may contain other components in addition such as diluents, other inert materials and solvents, i.e., common organic liquids which are inert under the reaction conditions and which may dissolve one or more of the reactants or products of the reaction, which solvents are exemplified by but not limited to aliphatic hydrocarbons, such as pentane, hexane, mineral spirits, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc. The hydrochloride salt by-product is generally not soluble in the above solvents. Accordingly, the insoluble salt usually forms a precipitate in the reaction mass and may be easily removed by filtration. When filtration is not desired or the salt is soluble in the solvent, the salt may be readily removed from the reaction mass by extraction with water.

The reaction is normally carried out at a temperature above the freezing point of the system but preferably not above its boiling point. Still more preferably, the reaction is carried out at temperatures of from about 0 degrees centigrade (° C.) to about 60° C. The reaction is most conveniently carried out at room temperature, about 23° C., in the presence of a solvent. The reaction is usually carried out at atmospheric pressure, but higher or lower pressures may be utilized if equipment and other factors favor such higher or lower pressures. The reaction may be carried out in an open vessel or under reflux.

Substituted S,S-dichloromethyl O,O-diorgano thioperoxyphosphorodithioates of this invention are useful as biocides. Exemplary of such biocidal uses for these products is the control of nematodes, arachnides, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of substituted dichloromethane sulfenyl chlorides, used as starting materials in the preparation of the compounds of the present invention, is taught in my prior U.S. patent applications Ser. Nos. 139,976 and 139,978, filed May 3, 1971, and each entitled "Substituted Alpha,Alpha-Dichloro-Methane Sulfenyl Chlorides and Their Manufacture."

O,O-diorgano phosphorodithioates used in the preparation of the compounds of the present invention are either known compounds or may be prepared by prior art methods from known compounds, e.g., the reaction of the appropriate alcohol with phosphorus pentasulfide.

As illustrative of this invention, but not limitative thereof, is the following:

EXAMPLE 1

To a suitable reaction vessel equipped with an agitator is charged approximately 150 milliliters (ml.) of benzene. Approximately 5.6 grams (g.), about 0.02 mole, of dichloro(diisopropylcarbamoyl)methane sulfenyl chloride and approximately 3.8 g., about 0.02 mole, of O,O-diethylphosphorodithioate are dissolved in the benzene. Then approximately 2 g., about 0.02 mole, of triethyl amine is added. A precipitate forms almost immediately. The precipitate is removed by filtration. Thereafter the benzene is removed by distillation leaving an oily residue. The oil is dissolved in petroleum ether and, upon cooling in Dry Ice, a white solid crystallizes out of the solution. The white solid is separated from the liquid by filtration, is found to be soluble in acetone, to be insoluble in water, and to have a melting point of about 60 to 63° C. and is identified by nuclear magnetic resonance as S,S-dichloro(diisopropylcarbamoyl)methyl O,O-diethyl thioperoxyphosphorodithioate

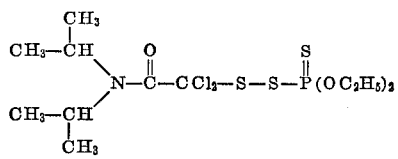

Calculated for $C_{12}H_{24}Cl_2NO_3PS_3$ (percent): C, 33.64; H, 5.64. Found (percent): C, 33.68; H, 5.68.

EXAMPLE 2

To a suitable reaction vessel equipped with an agitator is charged about 200 ml. of benzene. Approximately 21.3 g., about 0.0685 mole, of 2-(chlorothio)-2,2-dichloro-N-isopropylacetanilide is dissolved in the benzene. Approximately 12.7 g., about 0.0685 mole, of O,O-diethylphosphorodithioate is then added. Approximately 6.9 g., about 0.0685 mole, of triethyl amine is added dropwise and the mass is stirred overnight. The precipitate is removed from the liquid by filtration, and the benzene is then removed by distillation. An oil remains which does not recrystallize. The oil is found to be soluble in acetone and to be insoluble in water and is identified by nuclear magnetic resonance as S,S - dichloro(N-isopropyl-N-phenylcarbamoyl)methyl O,O - diethyl thioperoxyphosphorodithioate

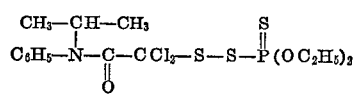

EXAMPLES 3 THROUGH 32

The procedure of Example 1 is folowed except that, in place of about 5.6 g. of dichloro(diisopropylcarbamoyl)methane sulfenyl chloride, an approximately equimolecular amount of the compound of column A is charged and the product of column B is obtained:

| Example | A | B |
|---|---|---|
| 3 | $(C_6H_5)_2N-\overset{O}{\underset{\|}{C}}-CCl_2-S-Cl$ | $(C_6H_5)_2N-\overset{O}{\underset{\|}{C}}-CCl_2-S-S-\underset{(C_2H_5O)_2}{\|}P=S$ |
| 4 | $CH_3CH_2O-N(-C_6H_3Cl_2)-\overset{O}{\underset{\|}{C}}-CCl_2-S-Cl$ (with 3,4-dichlorophenyl) | $CH_3CH_2O-N(-C_6H_3Cl_2)-\overset{O}{\underset{\|}{C}}-CCl_2-S-S-P(=S)(OC_2H_5)_2$ |
| 5 | $C_6H_5-\overset{O}{\underset{\|}{\underset{O}{S}}}-CCl_2-S-Cl$ | $C_6H_5-\overset{O}{\underset{\|}{\underset{O}{S}}}-CCl_2-S-S-\overset{S}{\underset{\|}{P}}(OC_2H_5)_2$ |
| 6 | $CH_3OCH_2-N(2,6-Et_2C_6H_3)-\overset{O}{\underset{\|}{C}}-CCl_2-S-Cl$ | $CH_3OCH_2-N(2,6-Et_2C_6H_3)-\overset{O}{\underset{\|}{C}}-CCl_2-S-S-P(=S)(OC_2H_5)_2$ |
| 7 | $(CH_3O)_2N-\overset{O}{\underset{\|}{C}}-CCl_2-S-Cl$ | $(CH_3O)_2N-\overset{O}{\underset{\|}{C}}-CCl_2-S-S-P(=S)(OC_2H_5)_2$ |
| 8 | $[CH_3(CH_2)_4O]_2N-\overset{O}{\underset{\|}{C}}-CCl_2-S-Cl$ | $[CH_3(CH_2)_4O]_2N-\overset{O}{\underset{\|}{C}}-CCl_2-S-S-P(=S)(OC_2H_5)_2$ |
| 9 | $(CH_3)_2CHO-N(C_2H_5O)-\overset{O}{\underset{\|}{C}}-CCl_2-S-Cl$ | $(CH_3)_2CHO-N(C_2H_5O)-\overset{O}{\underset{\|}{C}}-CCl_2-S-S-P(=S)(OC_2H_5)_2$ |
| 10 | $C_6H_5-N((CH_3)_2CHO)-\overset{O}{\underset{\|}{C}}-CCl_2-S-Cl$ | $C_6H_5-N((CH_3)_2CHO)-\overset{O}{\underset{\|}{C}}-CCl_2-S-S-\overset{S}{\underset{\|}{P}}(OC_2H_5)_2$ |
| 11 | $\underset{CH_3O}{\overset{C_2H_4OCH_2CH_2CH_3}{N}}-\overset{O}{\underset{\|}{C}}-CCl_2-S-Cl$ | $\underset{CH_3O}{\overset{C_2H_4OCH_2CH_2CH_3}{N}}-\overset{O}{\underset{\|}{C}}-CCl_2-S-S-\overset{S}{\underset{\|}{P}}(OC_2H_5)_2$ |
| 12 | (2-I-C₆H₄)(2-I-C₆H₄)N-C(=O)-CCl₂-S-Cl | (2-I-C₆H₄)(2-I-C₆H₄)N-C(=O)-CCl₂-S-S-P(=S)(OC₂H₅)₂ |
| 13 | (3-CH₃-C₆H₄)[(CH₃)₂CHO(CH₂)₄]N-C(=O)-CCl₂-S-Cl | (3-CH₃-C₆H₄)[(CH₃)₂CHO(CH₂)₄]N-C(=O)-CCl₂-S-S-P(=S)(OC₂H₅)₂ |
| 14 | $N\equiv C-CCl_2-S-Cl$ | $N\equiv C-CCl_2-S-S-\overset{S}{\underset{\|}{P}}(OC_2H_5)_2$ |
| 15 | $Br-C_6H_4-\overset{O}{\underset{\|}{\underset{O}{S}}}-CCl_2-S-Cl$ | $Br-C_6H_4-\overset{O}{\underset{\|}{\underset{O}{S}}}-CCl_2-S-S-P(=S)(OC_2H_5)_2$ |
| 16 | (2,6-(CH₃)₂-C₆H₃)-S(=O)₂-CCl₂-S-Cl | (2,6-(CH₃)₂-C₆H₃)-S(=O)₂-CCl₂-S-S-P(=S)(OC₂H₅)₂ |

| Example | A | B |
|---|---|---|
| 17 | 3-CF$_3$-C$_6$H$_4$-SO$_2$-CCl$_2$-S-Cl | 3-CF$_3$-C$_6$H$_4$-SO$_2$-CCl$_2$-S-S-P(=S)(OC$_2$H$_5$)$_2$ |
| 18 | 3,4,5-Cl$_3$-C$_6$H$_2$-C(=O)-CCl$_2$-S-Cl | 3,4,5-Cl$_3$-C$_6$H$_2$-C(=O)-CCl$_2$-S-S-P(=S)(OC$_2$H$_5$)$_2$ |
| 19 | C$_6$H$_5$-C(=O)-CCl$_2$-S-Cl | C$_6$H$_5$-C(=O)-CCl$_2$-S-S-P(=S)(OC$_2$H$_5$)$_2$ |
| 20 | 3-CF$_3$-C$_6$H$_4$-C(=O)-CCl$_2$-S-Cl | 3-CF$_3$-C$_6$H$_4$-C(=O)-CCl$_2$-S-S-P(=S)(OC$_2$H$_5$)$_2$ |
| 21 | 4-C$_2$H$_5$-C$_6$H$_4$-C(=O)-CCl$_2$-S-Cl | 4-C$_2$H$_5$-C$_6$H$_4$-C(=O)-CCl$_2$-S-S-P(=S)(OC$_2$H$_5$)$_2$ |
| 22 | 2,6-(CH$_3$CH(CH$_3$))$_2$-C$_6$H$_3$-C(=O)-CCl$_2$-S-Cl | 2,6-(CH$_3$CH(CH$_3$))$_2$-C$_6$H$_3$-C(=O)-CCl$_2$-S-S-P(=S)(OC$_2$H$_5$)$_2$ |
| 23 | C$_2$H$_5$-O-C(=O)-CCl$_2$-S-Cl | C$_2$H$_5$-O-C(=O)-CCl$_2$-S-S-P(=S)(OC$_2$H$_5$)$_2$ |
| 24 | (CH$_3$)$_2$CHCH$_2$O-C(=O)-CCl$_2$-S-Cl | (CH$_3$)$_2$CHCH$_2$O-C(=O)-CCl$_2$-S-S-P(=S)(OC$_2$H$_5$)$_2$ |
| 25 | C$_6$H$_5$CH$_2$-O-C(=O)-CCl$_2$-S-Cl | C$_6$H$_5$CH$_2$-O-C(=O)-CCl$_2$-S-S-P(=S)(OC$_2$H$_5$)$_2$ |
| 26 | CH$_3$-O-C(=O)-CCl$_2$-S-Cl | CH$_3$-O-C(=O)-CCl$_2$-S-S-P(=S)(OC$_2$H$_5$)$_2$ |
| 27 | (CH$_2$)$_4$N-C(=O)-CCl$_2$-S-Cl | (CH$_2$)$_4$N-C(=O)-CCl$_2$-S-S-P(=S)(OC$_2$H$_5$)$_2$ |
| 28 | (CH$_2$)$_5$N-C(=O)-CCl$_2$-S-Cl | (CH$_2$)$_5$N-C(=O)-CCl$_2$-S-S-P(=S)(OC$_2$H$_5$)$_2$ |
| 29 | [(CH$_3$)$_2$CH-CH$_2$]$_2$N-C(=O)-CCl$_2$-S-Cl | [(CH$_3$)$_2$CH-CH$_2$]$_2$N-C(=O)-CCl$_2$-S-S-P(=S)(OC$_2$H$_5$)$_2$ |
| 30 | (C$_2$H$_5$OCH$_2$)$_2$N-C(=O)-CCl$_2$-S-Cl | (C$_2$H$_5$OCH$_2$)$_2$N-C(=O)-CCl$_2$-S-S-P(=S)(OC$_2$H$_5$)$_2$ |
| 31 | CH$_3$(3-CCl$_3$-C$_6$H$_4$)N-C(=O)-CCl$_2$-S-Cl | CH$_3$(3-CCl$_3$-C$_6$H$_4$)N-C(=O)-CCl$_2$-S-S-P(=S)(OC$_2$H$_5$)$_2$ |
| 32 | H-C(=O)-CCl$_2$-S-Cl | H-C(=O)-CCl$_2$-S-S-P(=S)(OC$_2$H$_5$)$_2$ |

EXAMPLES 33 THROUGH 38

The procedure of Example 1 is followed except that, in place of about 3.8 g. of O,O-diethyl phosphorodithioate, an approximately equimolecular amount of the compound of column A is charged and the product of column B is obtained.

EXAMPLE 42

Contact herbicidal activity of representative substituted S,S-dichloromethyl O,O-diorgano thioperoxyphosphorodithioates of this invention is determined by the following procedure:

| Example | A | B |
|---|---|---|
| 33 | $(C_6H_5O)_2\overset{S}{\underset{\|}{P}}-SH$ | $\begin{array}{c}CH_3CHCH_3\\ \diagdown\\ \phantom{xx}N-\overset{O}{\underset{\|}{C}}-CCl_2-S-S\\ \diagup\phantom{xxxxxxxxxxxxx}\|\\ CH_3CHCH_3\phantom{xx}(C_6H_5O)_2\overset{}{P}=S\end{array}$ |
| 34 | $(C_6H_5CH_2O)_2\overset{S}{\underset{\|}{P}}-SH$ | $\begin{array}{c}CH_3CHCH_3\phantom{xx}O\\ \diagdown\phantom{xxxxxxxx}\|\\ \phantom{xx}N-C-CCl_2-S-S\\ \diagup\phantom{xxxxxxxxxxxxxxx}\|\\ CH_3CHCH_3\phantom{xx}(C_6H_5CH_2O)_2P=S\end{array}$ |
| 35 | $Cl-\bigcirc-O-\overset{S}{\underset{\underset{O-\bigcirc-Cl}{\|}}{P}}-SH$ | (S,S-dichloromethyl thioperoxyphosphorodithioate with bis(4-chlorophenoxy) groups and diisopropylamide) |
| 36 | $\begin{array}{c}CH_3\phantom{xxxxxx}CH_3\\ \bigcirc-O-\overset{S}{\underset{\underset{SH}{\|}}{P}}-O-\bigcirc\\ CH_3\phantom{xxxxxx}CH_3\end{array}$ | $\begin{array}{c}(CH_3)_2CH\phantom{xx}O\\ \diagdown\phantom{xxxxxx}\|\\ \phantom{xx}N-C-CCl_2-S-S-\overset{}{\underset{}{P}}=S\\ \diagup\\ (CH_3)_2CH\end{array}$ with bis(2,6-dimethylphenoxy) groups |
| 37 | $(CF_3O)_2\overset{S}{\underset{\|}{P}}-SH$ | $\begin{array}{c}CH_3CHCH_3\phantom{xx}O\\ \diagdown\phantom{xxxxxxxx}\|\\ \phantom{xx}N-C-CCl_2-S-S\\ \diagup\phantom{xxxxxxxxxxxxx}\|\\ CH_3CHCH_3\phantom{xx}(CF_3O)_2P=S\end{array}$ |
| 38 | $[(CH_3)_2CHCH_2O]_2\overset{S}{\underset{\|}{P}}-SH$ | $\begin{array}{c}(CH_3)_2CH\phantom{xx}O\\ \phantom{xxx}\|\phantom{xxxxxx}\|\\ (CH_3)_2CH-N-C-CCl_2-S-S\\ \phantom{xxxxxxxxxxxxxxxxxxx}\|\\ [(CH_3)_2CHCH_2O]_2P=S\end{array}$ |

EXAMPLE 39

The procedure of Example 1 is followed except that, instead of removing the precipitate from the reaction mass by filtration after cooling, about 200 ml. of water are added to the mass upon cooling and the mass is stirred until the precipitate is no longer visible. The mass then separates into an organic and an aqueous phase, the aqueous phase, which contains the dissolved precipitate, is removed and the organic phase is then processed as in Example 1. The product of Example 1 is obtained.

EXAMPLES 40 AND 41

The procedure of Example 1 is followed except that in place of triethyl amine about 0.02 mole of the specified trialkylamine is added with the pyrrolidine. The product of Example 1 is obtained.

Example 40—Tripropyl amine.
Example 41—Tributyl amine.

The compound to be tested is applied in spray form to plants of a given age of several grasses and broadleaf species. After the plants are the desired age, each aluminum pan is sprayed with a given volume of a 0.2 concentration solution of the candidate chemical, corresponding to a rate of approximately 3.6 lbs. per acre. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compound prepared in Example 2 is observed against lambsquarter.

EXAMPLE 43

Pre-emergent herbicidal activity of representative substituted S,S-dichloromethyl O,O-diorgano thioperoxyphosphorodithioates of this invention is determined by the following procedure:

A good grade of top soil is placed in aluminum pans and compacted to a depth of ⅜ to ½ inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

Pre-emergent activity of the compound prepared in Example 1 is observed against Canada thistle, lamb's-quarter, smartweed, quackgrass, and bromegrass (cheat). Pre-emergent activity of the compound prepared in Example 2 is observed against Canada thistle and bromegrass (cheat).

While this invention has been described with respect to certain embodiments, it is to be understood that it is not so limited and that variations and modifications thereof obvious to those skilled in the art to which this invention appertains can be made without departing from the spirit or scope thereof.

What is claimed is:

1. A substituted S,S-dichloromethyl O,O-diorgano thioperoxyphosphorodithioate of the formula

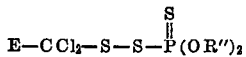

wherein E— is

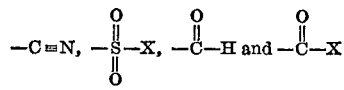

X is phenyl, halophenyl, trihalomethyl phenyl or lower alkyl phenyl and R″ is phenyl, halopheny, trihalomethyl phenyl, lower alkyl phenyl, primary or secondary lower alkyl, halo-substituted lower alkyl and phenyl-substituted lower alkyl.

2. A compound of claim 1 wherein E— is —C≡N.
3. A compound of claim 1 wherein E— is

4. A compound of claim 3 wherein R″ is primary or secondary lower alkyl.
5. A compound of claim 1 wherein E— is

6. A compound of claim 5 wherein R″ is primary or secondary lower alkyl.
7. A compound of claim 1 wherein E— is

8. A compound of the formula

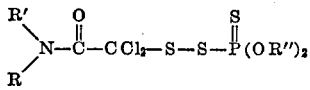

wherein R′ is phenyl, halophenyl, trihalomethyl phenyl or lower alkyl phenyl, R″ is primary or secondary lower alkyl and R is lower alkyl.

9. A compound of claim 8 wherein R″ is ethyl.
10. A compound of claim 9 wherein R is isopropyl.
11. The compound of claim 10 wherein R′ is phenyl.

References Cited
UNITED STATES PATENTS

| | | | |
|---|---|---|---|
| 2,868,687 | 1/1959 | Scott | 260—934 X |
| 2,335,953 | 12/1943 | McCracken et al. | 260—934 X |
| 3,035,082 | 5/1962 | Horenz | 260—934 |
| 3,109,770 | 11/1963 | Price et al. | 260—934 X |
| 3,144,384 | 8/1964 | Aichenegg | 260—934 X |

LEWIS GOTTS, Primary Examiner

R. L. RAYMOND, Assistant Examiner

U.S. Cl. X.R.

71—87; 260—239 B, 293.85, 326.82, 465.7, 481 R, 561 S, 562 S, 592, 607 A, 979; 424—200, 208